(12) United States Patent
Cloud et al.

(10) Patent No.: US 11,218,447 B2
(45) Date of Patent: Jan. 4, 2022

(54) FIREWALL RULE REMEDIATION FOR IMPROVED NETWORK SECURITY AND PERFORMANCE

(71) Applicant: DISNEY ENTERPRISES, INC., Burbank, CA (US)

(72) Inventors: Mark G. Cloud, Clermont, FL (US); Robert K. Floyd, III, Clermont, FL (US); Jeffrey Sol Mansukhani, La Crescenta, CA (US)

(73) Assignee: Disney Enterprises, Inc., Burbank, CA (US)

( * ) Notice: Subject to any disclaimer, the term of this patent is extended or adjusted under 35 U.S.C. 154(b) by 264 days.

(21) Appl. No.: 15/911,024

(22) Filed: Mar. 2, 2018

(65) Prior Publication Data

US 2019/0273720 A1 Sep. 5, 2019

(51) Int. Cl.
*H04L 29/06* (2006.01)
*H04L 12/24* (2006.01)

(52) U.S. Cl.
CPC ...... *H04L 63/0263* (2013.01); *H04L 41/0893* (2013.01); *H04L 63/0236* (2013.01); *H04L 63/20* (2013.01); *H04L 63/0209* (2013.01)

(58) Field of Classification Search
CPC . H04L 63/0263; H04L 63/0236; H04L 63/20; H04L 63/0209; H04L 41/0893
See application file for complete search history.

(56) References Cited

U.S. PATENT DOCUMENTS

| | | | | |
|---|---|---|---|---|
| 7,093,283 B1* | 8/2006 | Chen | ...................... | H04L 63/104 709/242 |
| 7,483,423 B2* | 1/2009 | Grewal | ................. | H04L 63/123 370/252 |
| 7,561,587 B2* | 7/2009 | Douglass | .............. | H04L 49/602 370/401 |
| 7,577,737 B2* | 8/2009 | Fawcus | ................... | H04L 45/00 370/235 |
| 8,037,517 B2* | 10/2011 | Fulp | ..................... | H04L 63/0263 726/11 |

(Continued)

FOREIGN PATENT DOCUMENTS

WO   WO-2014203363 A1 * 12/2014 ............. H04L 12/44

OTHER PUBLICATIONS

Andrés F. Ocampo, et al., A network challenge identification strategy based on firewall performance analysis, 2013 47th International Carnahan Conference on Security Technology (ICCST), pp. 1-6.*

*Primary Examiner* — Henry Tsang
(74) *Attorney, Agent, or Firm* — Artegis Law Group, LLP (57) ABSTRACT

A firewall manager periodically accesses a set of servers to identify the various services currently active on each server. The firewall manager also periodically accesses a set of firewalls configured to protect those servers to identify various firewall rules implemented by those firewalls. The firewall manager then compares the services data with the rules data to identify any obsolete firewall rules that are (i) defined based on an IP address not currently allocated to any of the servers or (ii) defined based on a port of an active server that is not associated with any service running on server. Such rules are considered obsolete. Upon identifying any obsolete firewall rules, the firewall manager accesses the firewalls associated with those rules and then removes the obsolete rules.

20 Claims, 9 Drawing Sheets

(56) References Cited

U.S. PATENT DOCUMENTS

| | | | | |
|---|---|---|---|---|
| 8,266,685 B2* | 9/2012 | Abzarian | ............... | G06F 8/61 |
| | | | | 370/351 |
| 8,296,380 B1* | 10/2012 | Kelly | ............... | H04L 51/32 |
| | | | | 709/206 |
| 8,973,088 B1* | 3/2015 | Leung | ............... | H04L 63/00 |
| | | | | 726/1 |
| 9,515,993 B1* | 12/2016 | Hwang | ............... | H04L 63/0263 |
| 9,557,889 B2* | 1/2017 | Raleigh | ............... | H04M 15/77 |
| 9,621,516 B2* | 4/2017 | Basak | ............... | H04L 63/0218 |
| 9,794,229 B2* | 10/2017 | Yu | ............... | H04L 63/1425 |
| 9,860,279 B2* | 1/2018 | Jain | ............... | G06F 16/9024 |
| 10,148,696 B2* | 12/2018 | Nimmagadda | ............... | H04L 63/20 |
| 10,467,104 B1* | 11/2019 | Samala | ............... | G06F 11/1446 |
| 10,505,827 B2* | 12/2019 | Parandehgheibi | ............... | H04J 3/14 |
| 2004/0122967 A1* | 6/2004 | Bressler | ............... | H04L 47/125 |
| | | | | 709/232 |
| 2006/0114917 A1* | 6/2006 | Raisch | ............... | H04L 63/20 |
| | | | | 370/401 |
| 2006/0230442 A1* | 10/2006 | Yang | ............... | H04L 63/0263 |
| | | | | 726/11 |
| 2008/0005795 A1* | 1/2008 | Acharya | ............... | H04L 63/0263 |
| | | | | 726/23 |
| 2008/0289026 A1* | 11/2008 | Abzarian | ............... | G06F 21/57 |
| | | | | 726/11 |
| 2017/0063928 A1* | 3/2017 | Jain | ............... | H04L 67/1097 |
| 2017/0310663 A1* | 10/2017 | Krishan | ............... | H04L 63/083 |
| 2018/0131605 A1* | 5/2018 | Jain | ............... | H04L 45/70 |

* cited by examiner

FIREWALL RULE REMEDIATION FOR IMPROVED NETWORK SECURITY AND PERFORMANCE

BACKGROUND

Field of the Various Embodiments

The various embodiments relate generally to computer networks, and, more specifically, to firewall rule remediation for improved network security and performance.

Description of the Related Art

Conventional computing clouds include networks of virtual machines (VMs) configured to receive and process network traffic. For example, a computing cloud could include a network of VMs that operate as web servers to service hypertext transfer protocol (HTTP) requests. During operation and over time, various VMs may be dynamically instantiated and terminated within computing cloud networks. When a VM is instantiated, various network resources are allocated to the VM to facilitate network communications. Those resources typically include an internet protocol (IP) address and/or a media access control (MAC) address, among others. When the VM is terminated, those network resources are de-allocated and returned to a provisioning pool.

For enhanced security, VMs can be protected by firewalls. A firewall that is configured to protect a given VM implements a set of rules according to what network traffic is selectively forwarded to the VM. For example, a firewall rule could indicate that any transmission control protocol (TCP) traffic targeting port 80 should be forwarded to the IP address associated with the VM. In such implementations, network traffic that is not governed by a specific rule in the set of rules is rejected and not forwarded to the IP address associated with the VM, thereby protecting the VM from unwanted and potentially malicious network traffic. Despite their utility, however, conventional firewalls suffer from certain specific drawbacks.

In particular, a conventional firewall defines firewall rules based on IP addresses and other network resources that can be allocated and reallocated across multiple VMs. Consequently, the firewall rules associated with a given IP address can be inherited by any VM to which that IP address is allocated. This type of set-up can pose a security risk because a newly instantiated VM that is allocated an IP address associated with pre-existing firewall rules can be inadvertently exposed to unwanted or malicious traffic that is permitted by the pre-existing rules.

In addition, firewall rules usually persist independently of the state of the VMs that the firewall rules are meant to protect. Accordingly, when a given VM is terminated, a firewall configured to protect that particular VM maintains the firewall rules associated with the VM. Over time, the firewall may end up storing numerous obsolete firewall rules designed to protect VMs that have been terminated. Obsolete firewall rules needlessly consume firewall memory. Further, obsolete firewall rules cause the firewall to expend needless processor cycles because the firewall has to examine all firewall rules when filtering network traffic, including the obsolete rules. Over time, as the number of obsolete firewall rules associated with a given firewall increases, the speed with which the firewall can analyze network traffic can decrease significantly, thereby decreasing overall network performance.

As the foregoing illustrates, what is needed in the art are more effective approaches to maintaining firewall rules in cloud-based computing environments.

SUMMARY

Various embodiments include a computer-implemented method for remediating obsolete firewall rules within a firewall, including generating services data indicating one or more services running on a set of servers included within a network, generating rules data indicating one or more firewall rules implemented by a first firewall included in a set of firewalls, comparing at least a portion of the services data to at least a portion of the rules data to identify a first firewall rule included in the one or more firewall rules that meets at least one remediation criterion, and causing the first firewall to remove the first firewall rule from the one or more firewall rules, wherein removing the first firewall rule from the one or more firewall rules causes the first firewall to prevent at least a portion of network traffic from entering the network.

At least one advantage of the disclosed techniques is that obsolete firewall rules cannot be inherited when servers are allocated previously used IP addresses, thereby mitigating or eliminating a significant security risk.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

As noted above, conventional firewalls implement firewall rules in a manner that may pose a security risk. In particular, a conventional firewall defines firewall rules based on IP addresses that may be de-allocated and reallocated across multiple different VMs within a computing cloud. Consequently, VMs can be allocated IP addresses associated with pre-existing firewall rules, potentially exposing those VMs to unwanted or malicious traffic. In addition, a conventional firewall maintains firewall rules independently of the state of the VMs those rules are intended to protect. Over time, the firewall may accumulate obsolete firewall rules associated with terminated VMs, thereby increasing memory consumption and processor utilization and eventually slowing the overall operation of the firewall. In turn, network throughput may decrease.

To address these issues, some embodiments include a firewall manager that analyzes and remediates firewall rules implemented by firewalls configured to protect servers within a network. The firewall manager periodically accesses the servers to identify various services currently running on each server. The firewall manager then populates a database with services data indicating these running services. The firewall manager also periodically accesses the firewalls configured to protect those servers to identify various firewall rules. The firewall manager then populates a database with rules data indicating these rules.

By comparing the services data with the rules data, the firewall manager identifies any obsolete firewall rules. The firewall manager may identify an obsolete firewall rule by determining that a given rule is defined based on an IP address not currently allocated to any of the servers. The firewall manager may also identify an obsolete firewall rule by determining that a given rule allows traffic to a port of an active server that is not associated with a service running on that server. Upon identifying any obsolete firewall rules, the firewall manager accesses the firewalls associated with those rules, and then updates those firewalls to remove the obsolete rules. In this fashion, the firewall manager remediates firewall rules based on the current state of the servers in the network. The firewall manager may remediate firewall rules in this manner periodically. The firewall manager may also remediate firewall rules in response to network changes, including the instantiation and/or termination of servers in the network. According to these techniques, the firewall manager maintains valid firewall rules on an ongoing basis.

At least one advantage of the disclosed techniques is that obsolete firewall rules cannot be inherited when servers are allocated previously used IP addresses, thereby mitigating or eliminating a significant security risk. Another advantage of these techniques is that firewall memory is continuously pruned when obsolete firewall rules are removed, thus minimizing the memory footprint associated with the storage of firewall rules. Yet another advantage is that firewall processor cycles need not be wasted examining obsolete firewall rules. Therefore, the speed with which a firewall analyzes network traffic can be maximized and network performance can be maintained. Because the firewall manager increases network security and increases network performance, the disclosed approach represents a significant technological advancement compared to conventional approaches.

System Overview

Figure 1:
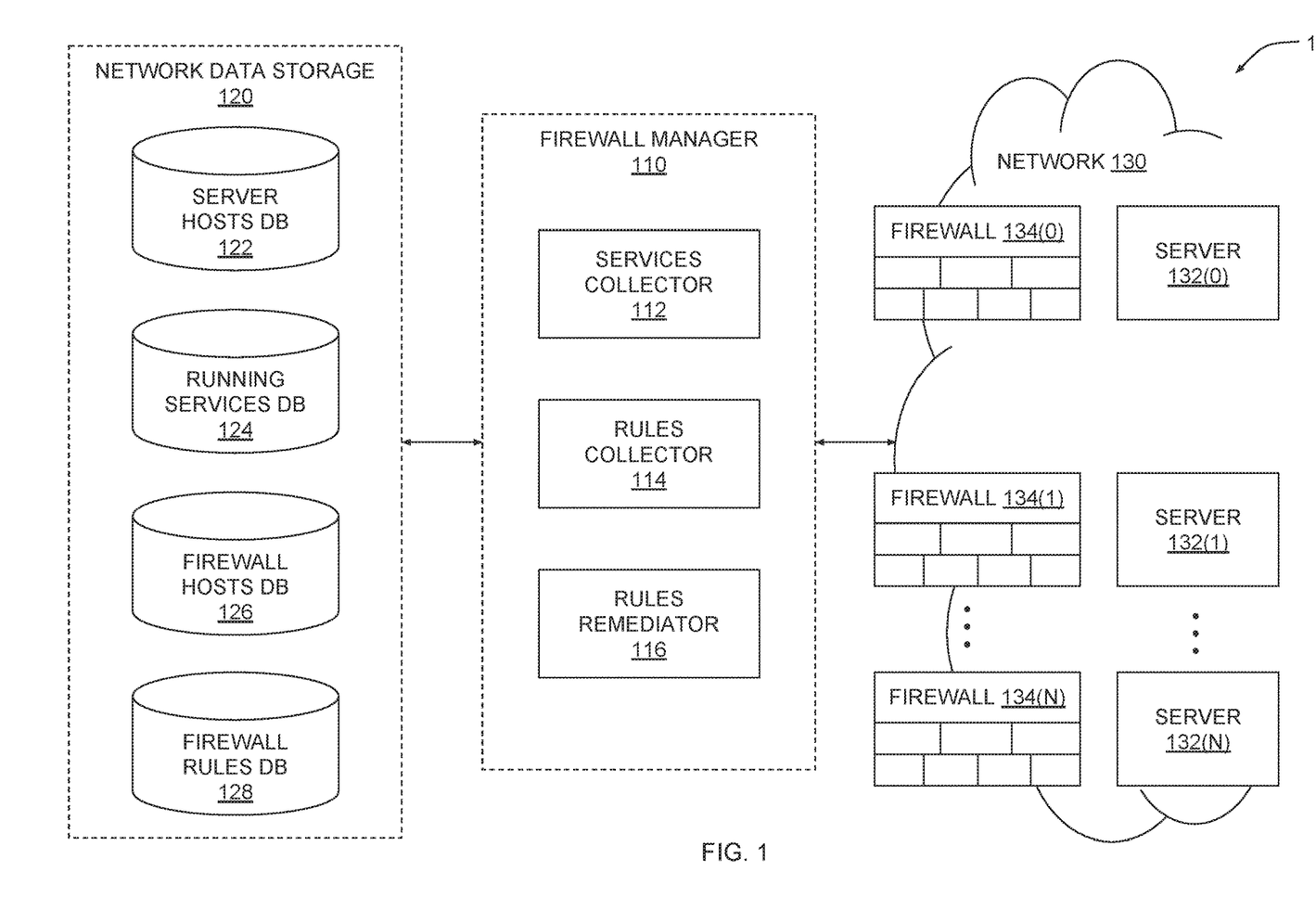
FIG. 1 illustrates a system configured to implement one or more aspects of the various embodiments.

FIG. 1 illustrates a system configured to implement one or more aspects of the various embodiments. As shown, a system 100 includes a firewall manager 110 coupled between network data storage 120 and a network 130. Firewall manager 110 includes a services collector 112, a rules collector 114, and a rules remediator 116. Data storage 120 includes a collection of databases (DBs), including a server hosts DB 122, a running services DB 124, a firewall hosts DB 126, and a firewall rules DB 128. Network 130 includes servers 132 and firewalls 134. The various elements of system 100 shown in FIG. 1 may be deployed within a cloud computing environment.

In operation, firewall manager 110 accesses servers 132 and firewalls 134 within network 130 to extract various network data. That network data may include services data describing a set of services running on servers 132. The network data may also include rules data describing a set of firewall rules implemented by firewalls 134. Firewall manager 110 stores this data within network data storage 120. Then, firewall manager 110 compares the set of running services to the set of firewall rules to identify any firewall rules that are inapplicable to servers 132 and/or inapplicable to any services running on servers 132. Firewall rules meeting either of these two criteria are considered obsolete. Firewall manager 110 is configured to remove any obsolete firewall rules from firewalls 134.

In practice, firewall manager 110 implements services collector 112, rules collector 114, and rules remediator 116 to perform the above-described operations. Firewall manager 110 implement services collector 112 to collect the services data from servers 132 using access credentials and routing information stored in server hosts DB 122. Services collector 112 then populates running services DB 124 with the services data. Services collector 112 is described in greater detail below in conjunction with FIGS. 4-5. Firewall manager 110 also implements rules collector 114 to collect the rules data from firewalls 134 using access credentials and routing information stored in the firewall hosts DB 126. Rules collector 114 then populates firewall rules DB 128 with the rules data. Rules collector 114 is described in greater detail below in conjunction with FIGS. 6-7. Firewall manager 110 further implements rules remediator 116 to compare the services data stored in running services DB 124 with the rules data stored in firewall rules DB 128. Based on this comparison, rules remediator 116 identifies obsolete firewall rules and then initiates the removal of those rules from the corresponding firewalls 134. Rules remediator 116 is described in greater detail below in conjunction with FIGS. 8-9.

As a general matter, any of the elements of system 100 may be implemented via one or more physical computing devices and/or one or more virtual computing devices. For example, firewall manager 110 could be implemented via a single computing device configured to execute a firewall management application that includes services collector 112, rules collector 114 and rules remediator 116. Alternatively, firewall manager 110 could be implemented via a collection of computing devices, each configured to execute a different one of the aforesaid elements of firewall manager 110. Similarly, network data storage 120 may be implemented via a single computing device that manages the various databases shown, or a collection of different computing devices, each configured to manage one or more of those databases.

Figure 2:
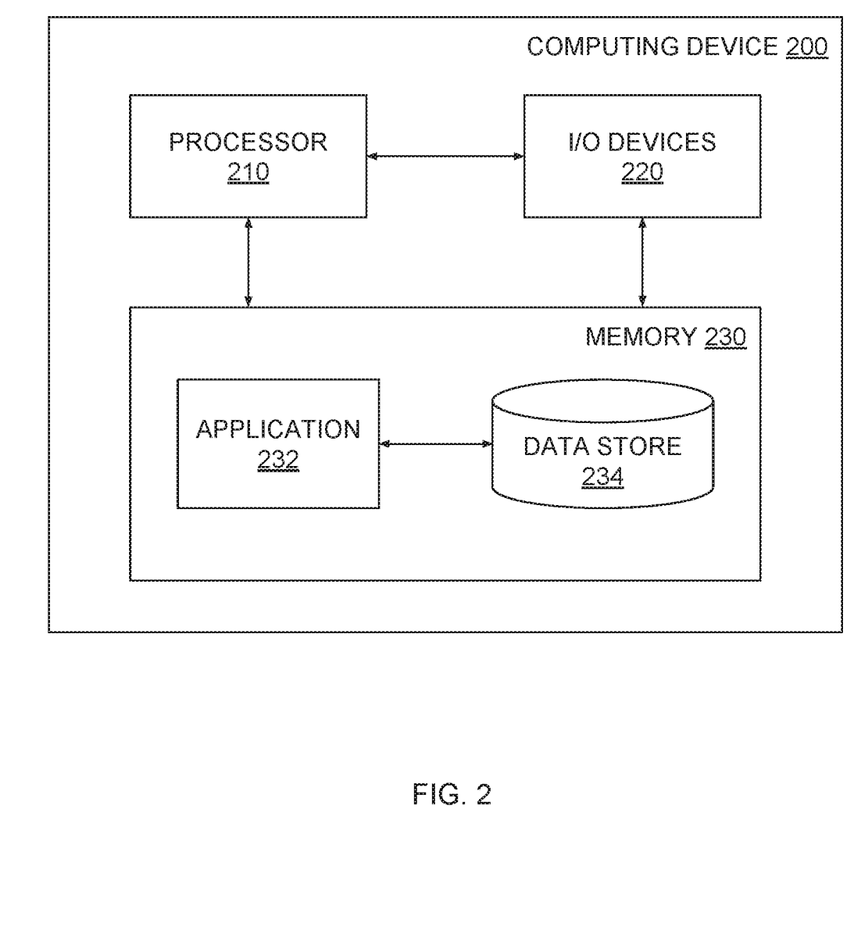
FIG. 2 illustrates a computing device that can be implemented in the system of FIG. 1, according to various embodiments.

Person skilled in the art will recognize that numerous architectures may implement the system 100 beyond the architecture shown in FIG. 1. Person skilled in the art will also recognize that any technically feasible type of computing device, physical or virtual, may implement any of the elements of system 100. FIG. 2 illustrates an exemplary computing device included in system 100.

FIG. 2 illustrates a computing device that can be implemented in the system of FIG. 1, according to various embodiments. As shown, a computing device 200 includes a processor 210, input/output (I/O) devices 220, and a memory 230, coupled together. Processor 210 is configured to process data and execute software applications. I/O devices 220 are configured to receive input and provide output. Memory 230 is a computer-readable storage medium storing an application 232 and a data store 234. Application 232 includes program code that, when executed by processor 210, causes processor 210 to perform any of the various operations described herein. Data store 234 facilitates read and write operations performed by application 232 to store and retrieve data, respectively. As mentioned, computing device 200 may implement any of the various elements of system 100 described herein. Those elements may specifically include firewall manager 110 and/or elements included therein, network data storage 120 and/or elements included therein, and network 130 and/or elements included therein.

Figure 3:
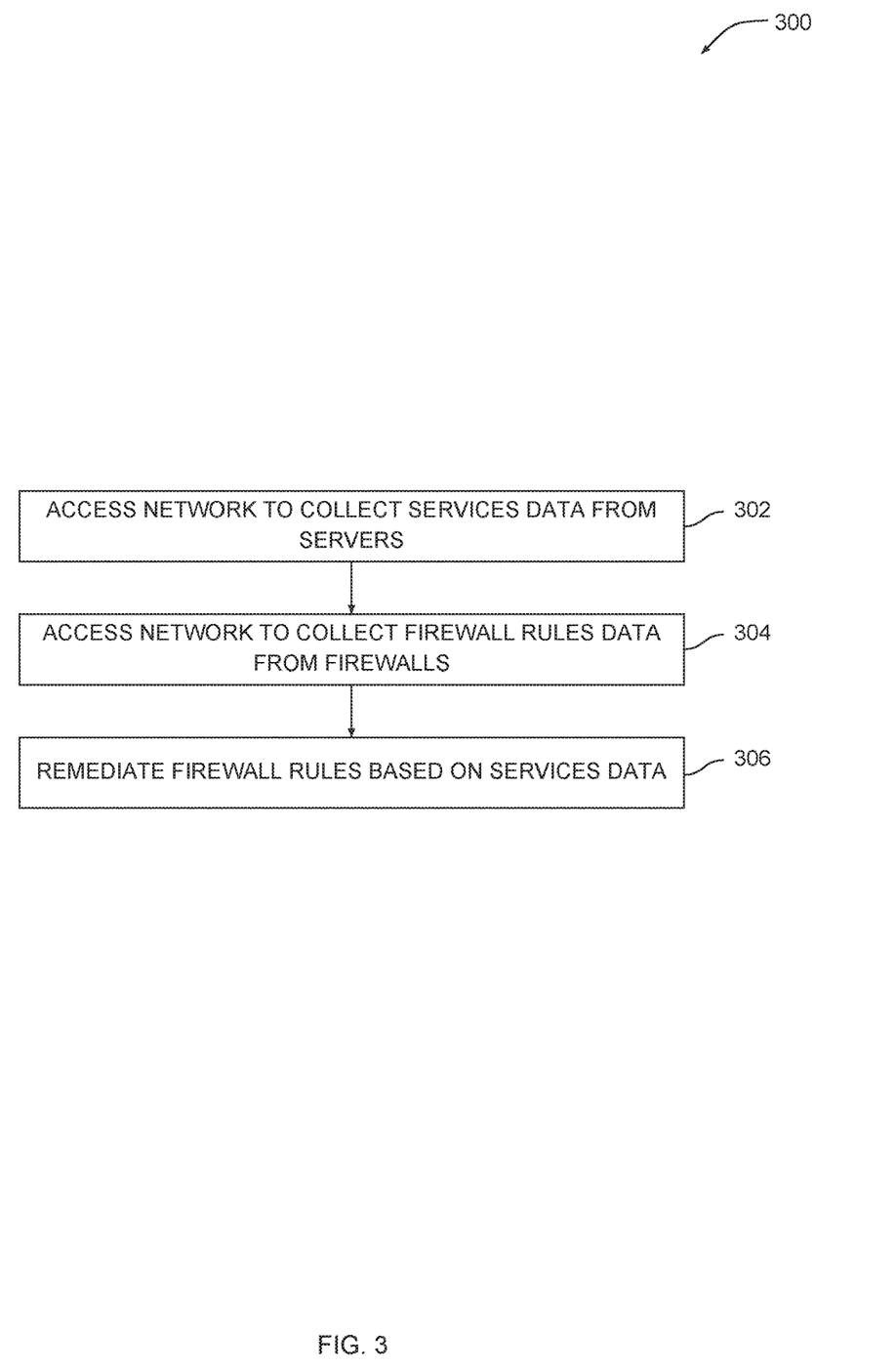
FIG. 3 is a flow diagram of method steps for managing firewall rules, according to various embodiments.

FIG. 3 is a flow diagram of method steps for managing firewall rules, according to various embodiments. Although the method steps are described in conjunction with the systems of FIGS. 1-2, persons skilled in the art will understand that any system may be configured to perform the method steps in any order.

As shown, and method 300 begins at step 302, where services collector 112 accesses network 130 to collect services data from servers 132. The services data indicates specific services running on each server 132 and any ports associated with those services. At step 304, rules collector 114 accesses network 130 to collect rules data from firewalls 134. The rules data indicates specific firewall rules implemented by each firewall 134 with respect to various IP addresses that may, in some cases, be associated with servers 132. At step 306, rules remediator 116 remediates the firewall rules implemented by firewalls 134 based on the collected services data. In doing so, rules remediator 116 compares the services data collected at step 302 with the firewall rules data collected at step 304 to identify any obsolete firewall rules that can be removed. Rules remediator 116 may then excise those rules from the corresponding firewalls 134.

Referring generally to FIGS. 1-3, firewall manager 110 advantageously updates sets of firewall rules by removing obsolete rules, thereby enhancing the security of network 130 and minimizing resource utilization. Accordingly, firewall manager 110 improves the operation of network 130. Specific techniques implemented by services collector 112, rules collector 114, and rules remediator 116 are described in greater detail below in conjunction with FIGS. 4-5, 6-7, and 8-9, respectively.

Service Collector

Figure 4:
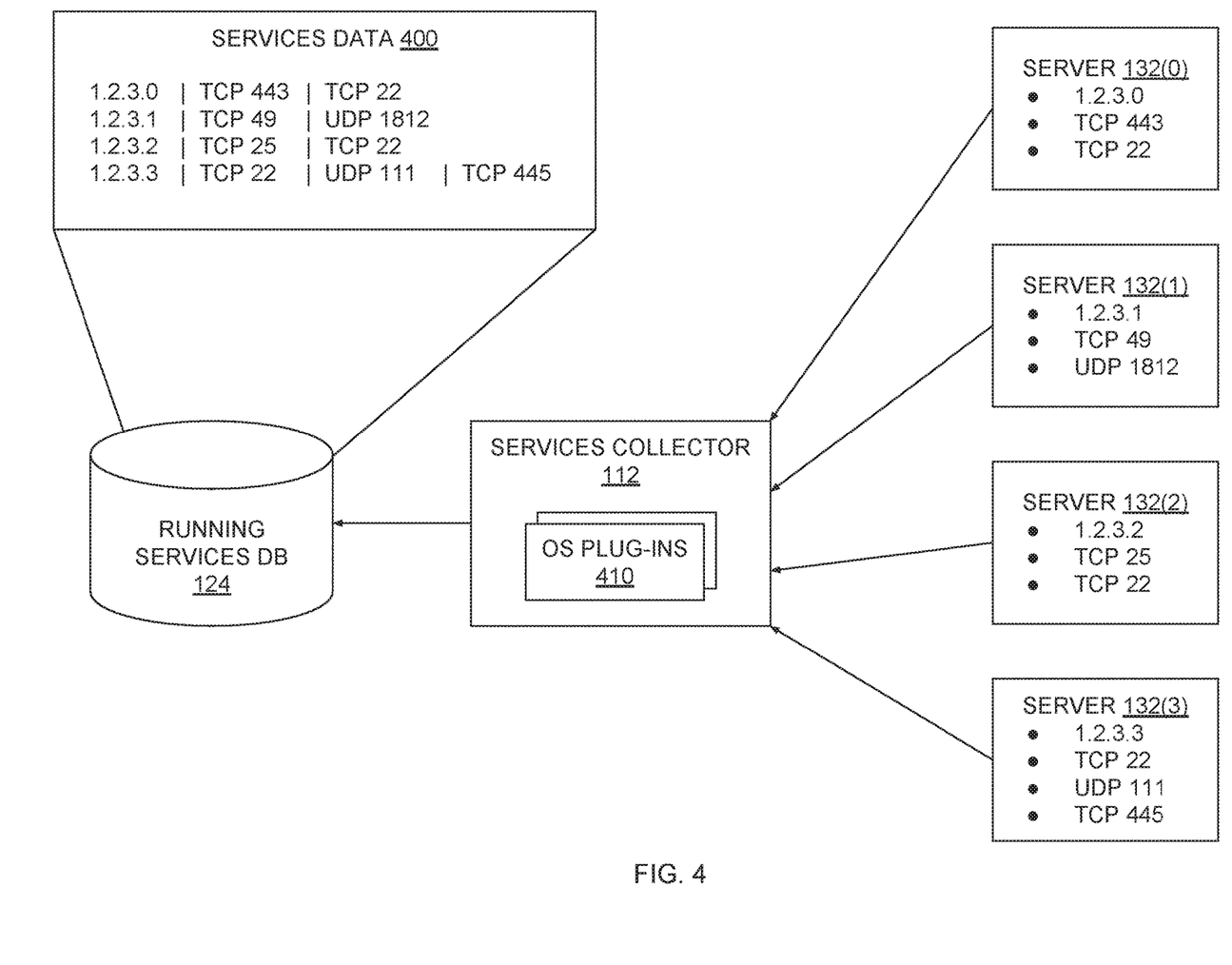
FIG. 4 illustrates how the services collector of FIG. 1 populates a services database, according to various embodiments.

FIG. 4 illustrates how the services collector of FIG. 1 populates a services database, according to various embodiments. As shown, services collector 112 populates running services DB 124 with services data 400. Services data 400 includes various rows that associate IP addresses with network protocols and ports. A given row of services data 400 may include an IP address of a server 132, a port associated with that server 132, and a transmission protocol that can be used for transmitting network traffic to the server 132 via that port. Services collector 112 may generate each row of services data 400 by accessing each server 132 in turn. To generate a given row of services data 400, services collector 112 performs the following collection procedure.

First, services collector 112 accesses server hosts DB 122 to obtain an IP address associated with a currently active server 132 within network 130. Services collector 112 also obtains access credentials associated with that server 132. Then, services collector 112 establishes network communications with the server 132 using the IP address and access credentials. Because different servers 132 may execute different operating systems (OS), services collector 112 maintains a set of OS plug-ins 410 that include OS-specific commands for interfacing with different OSs. To establish network communications, services collector 112 may determine the OS executing on the server 132 and then identify a corresponding OS plug-in 410 that includes OS-specific commands for interacting with the OS. OS plug-ins 410 may also be referred to as "OS interfaces."

Once services collector 112 has established network communications with the server 132, services collector 112 then executes a network inquiry command with the server 132. In doing so, services collector 112 may rely on the identified OS plug-in 410 to determine an appropriate network inquiry command. For example, services collector 112 could determine that server 132 executes Linux-based operating system, and then determine that "NSLOOKUP" is the appropriate network inquiry command. Services collector 112 then executes the network inquiry command on the server 132 to identify the specific ports on which the server 132 listens for network traffic. Services collector 112 also identifies the expected transmission protocols associated with those ports. Services collector 112 parses the output of the network inquiry command using the identified OS plug-in 410 to normalize that output. Services collector 112 may then store the normalized output within running services DB 124, thereby generating a row of services data 400.

In a specific example of this procedure, services collector 112 could obtain from server hosts DB 122 access credentials for accessing IP address 1.2.3.0 associated with server 132(0). Services collector 112 would then determine the OS executing on server 132(0) and identify the corresponding OS plug-in 410. Services collector 112 then executes an OS-specific network inquiry command with server 132(0) to determine that server 132(0) supports a transmission control protocol (TCP) service running on port 443 and another TCP Service running on port 22. These services may handle hypertext transmission protocol secure (HTTPS) traffic and secure shell (SSH) traffic, respectively. Services collector 112 normalizes this network information and then generates row zero of services data 400, which correlates IP address 1.2.3.0 with the TCP-based services available on ports 443 and 22, as is shown.

Services collector 112 performs the above-described procedure with each server 132 on a periodic basis and/or in response to specific network events. For example, services collector 112 could populate or update running services DB 124 according to an hourly cron schedule. Services collector 112 could also populate or update running services DB 124 any time a server 132 is instantiated or terminated. The various steps performed by services collector 112 to generate services data 400 are described in stepwise fashion below in conjunction with FIG. 5.

Figure 5:
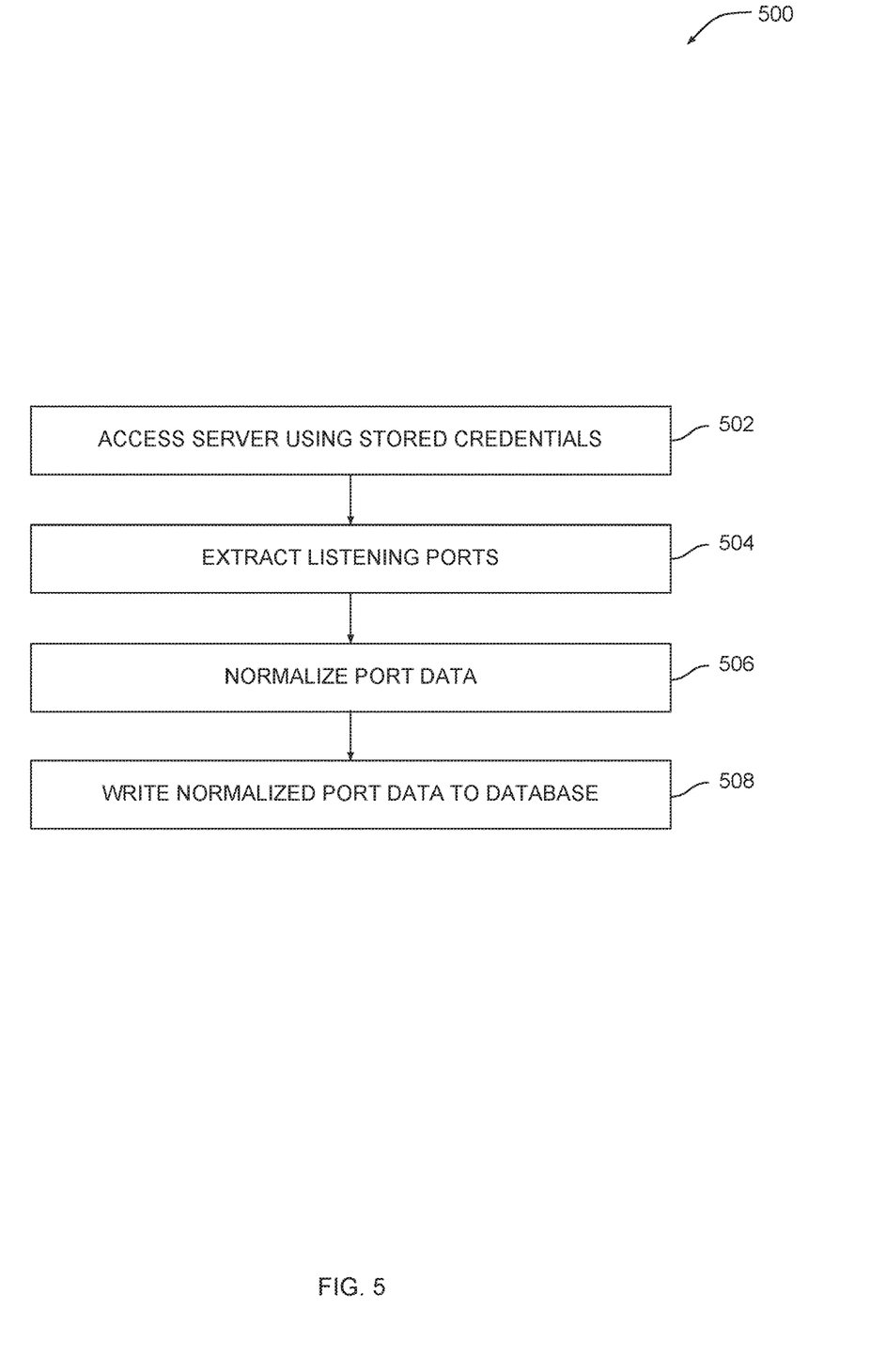
FIG. 5 is a flow diagram of method steps for storing services data in a services database, according to various embodiments.

FIG. 5 is a flow diagram of method steps for storing services data in a services database, according to various embodiments. Although the method steps are described in conjunction with the systems of FIGS. 1-4, persons skilled in the art will understand that any system may be configured to perform the method steps in any order.

As shown, a method 500 begins at step 502, where services collector 112 accesses a server 132 using credentials stored in server host DB 122. Server hosts DB 122 also stores IP addresses associated with each server 132 and, potentially, information regarding the OS executing on each server 132. At step 504, services collector 112 executes a network inquiry command with the server 132 to extract the set of ports on which the server 132 listens. These ports generally correspond to services running on the server 132 and correspond to particular transmission protocols. At step 506, services collector 112 normalizes the extracted data to adhere to a standard format. Then, at step 508, services collector 112 writes the normalized port data to running services DB 124.

Referring generally to FIGS. 4-5, through the techniques described above services collector 112 maintains a continuously updated record of all services running on each server 132 included in network 130. Rules collector 114 performs a similar technique to maintain a record of all firewall rules implemented by firewalls 134, as described in greater detail below in conjunction with FIGS. 6-7.

Rules Collector

Figure 6:
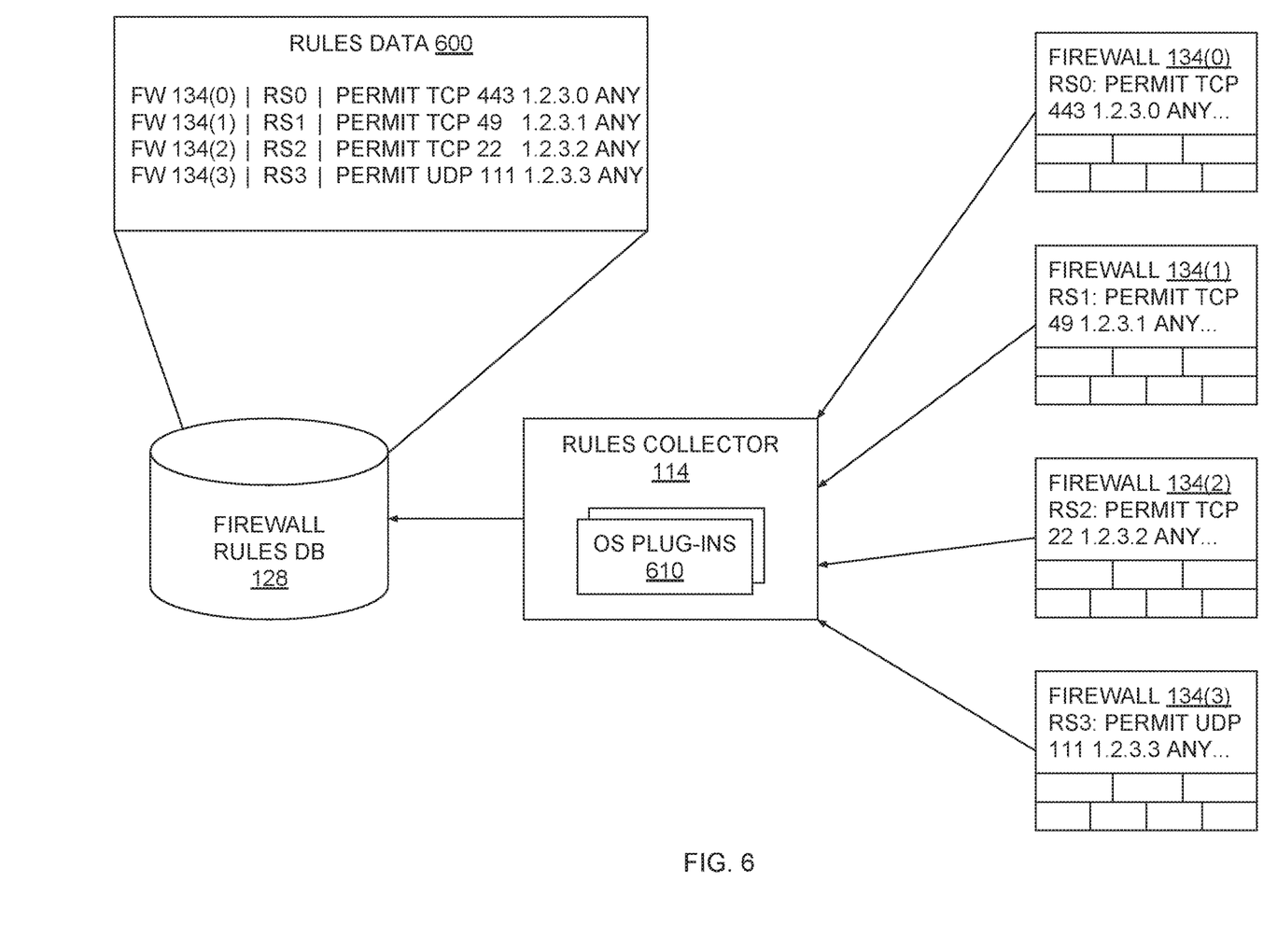
FIG. 6 illustrates how the rules collector of FIG. 1 populates a firewall rules database, according to various embodiments.

FIG. 6 illustrates how the rules collector of FIG. 1 populates a firewall rules database, according to various embodiments. As shown, rules collector 114 populates firewall rules DB 128 with rules data 600. Rules data 400 includes various rows that associate specific firewalls with rulesets. A given row of rules data 600 may include a name (or other identifier) associated with a firewall 134, a name associated with a particular rule set, and an access policy defining the rule set. Rules collector 114 may generate each row of rules data 600 in a procedural manner by accessing each firewall 134. To generate a given row of rules data 600, rules collector 114 performs the following process.

First, rules collector 114 accesses firewall hosts DB 126 to obtain access credentials and network information associated with a given firewall 134. Then, rules collector 114 establishes network communications with the firewall 134. Different firewalls 134 may execute different OS, and so rules collector 114 may rely on a relevant OS plug-in 610 for interacting with the firewall 134. OS plug-ins 610 may also be referred to as "OS interfaces."

Upon establishing network communications, rules collector 114 then determines a rules inquiry command to execute with the firewall 134. Rules collector 114 may determine an OS-specific rules inquiry command for the firewall 134 using OS plug-ins 610. For example, rules collector 114 could determine that firewall 134 executes a Linux-based operating system, and then determine that "IPTABLES" is the appropriate rules inquiry command. Rules collector 114 then executes the rules inquiry command to extract all firewall rules currently implemented by the firewall 134. Rules collector 114 parses the output of the rules inquiry command using the identified OS plug-in 610 to normalize that output. Rules collector 114 may then store the normalized output within firewall rules DB 128, thereby generating a row of rules data 600.

As an example of this process, rules collector 114 could obtain from firewall hosts DB 126 access credentials for accessing firewall 134(0). Rules collector 114 would then determine the OS executing on firewall 134(0) and identify the corresponding OS plug-in 610. Rules collector 114 then executes an OS-specific rules inquiry command with firewall 134(0) to determine that firewall 134(0) implements a set of rules named rule set 0 (RS0). RS0 indicates that IP address 1.2.3.0 is allowed to receive TCP traffic on port 443 originating from any source IP address. Rules collector 114 normalizes this data using the appropriate plug-in 610 and then generates row zero of rules data 600, which correlates firewall 134(0) and RS0 to particular access policy.

Figure 7:
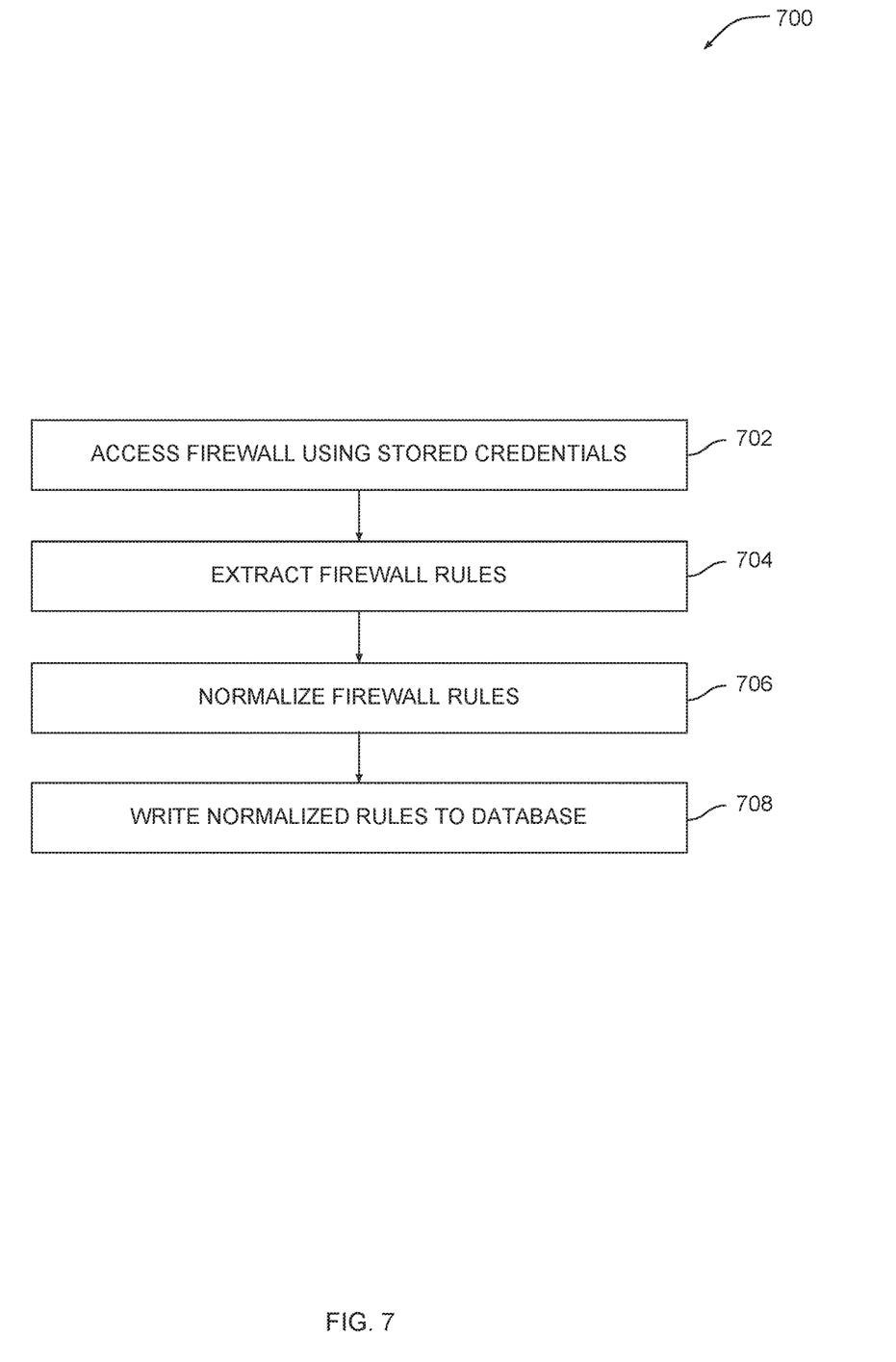
FIG. 7 is a flow diagram of method steps for storing firewall rules data in a database, according to various embodiments.

FIG. 7 is a flow diagram of method steps for storing firewall rules data to a database, according to various embodiments. Although the method steps are described in conjunction with the systems of FIGS. 1-6, persons skilled in the art will understand that any system may be configured to perform the method steps in any order.

As shown, a method 700 begins at step 702, where rules collector 114 accesses a firewall 134 using credentials stored in firewall hosts DB 126. Firewall hosts DB 126 may also store IP addresses associated with each firewall 134 and, potentially, information regarding the OS executing on each firewall 134. At step 704, rules collector 114 executes a rules inquiry command with the firewall 134 to extract the set of firewall rules currently implemented by the firewall 134. These rules generally restrict network traffic to a server 132 the firewall 134 is configured to protect. At step 706, rules collector 114 normalizes the extracted firewall rules to adhere to a standard format. Then, at step 708, rules collector 114 writes the normalized firewall rules to firewall rules DB 128.

Referring generally to FIGS. 6-7, the above technique allows rules collector 114 to maintain a continuously updated record of all firewall rules implemented by firewalls 134. By comparing currently active services stored in running services DB 124 with the firewall rules stored in firewall rules DB 128, rules remediator 116 is configured to validate firewall rules and remove obsolete firewall rules, as described in greater detail below in conjunction with FIGS. 8-9.

Rules Remediator

Figure 8:
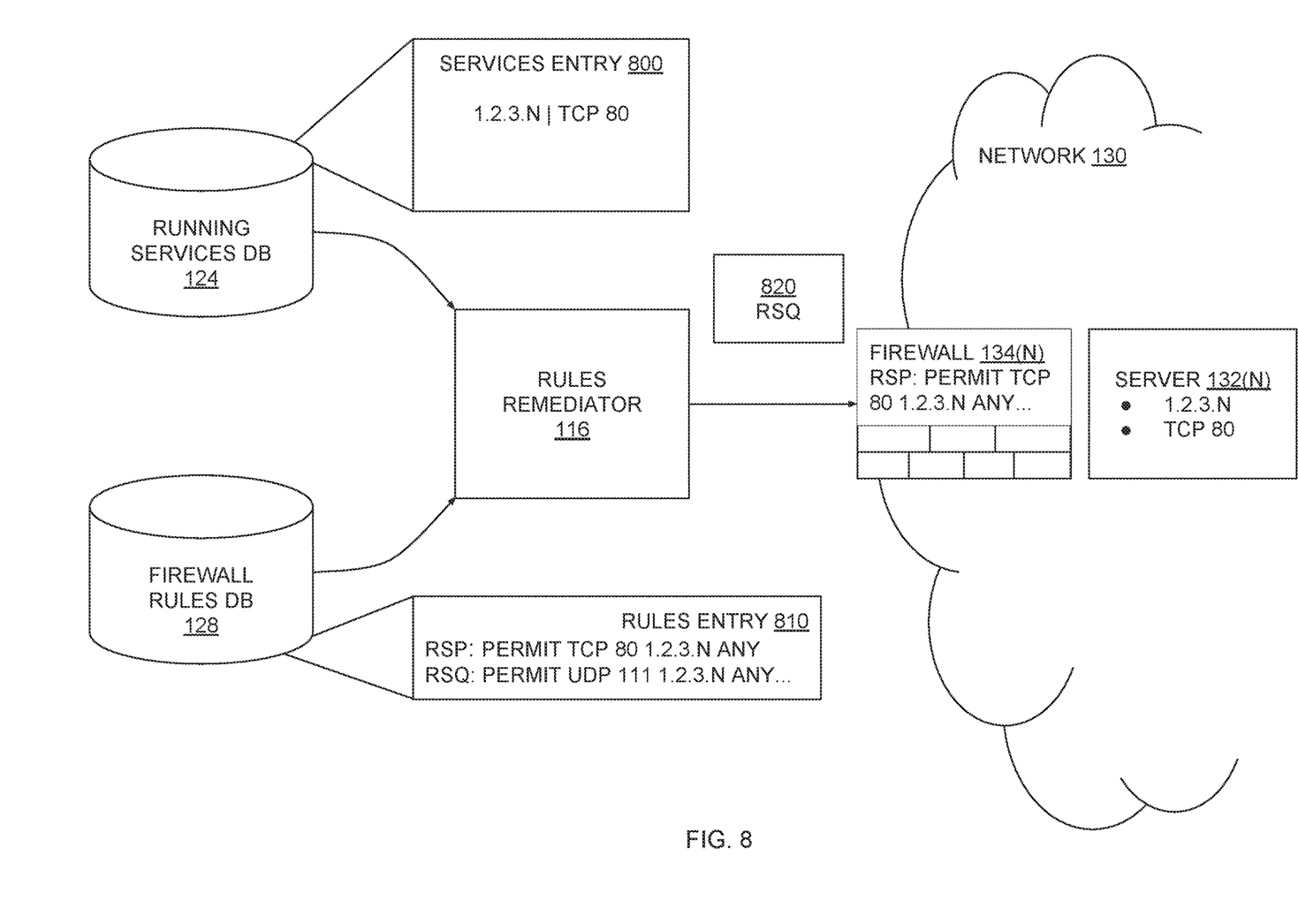
FIG. 8 illustrates how the rules remediator of FIG. 1 removes obsolete firewall rules from a firewall, according to various embodiments.

FIG. 8 illustrates how the rules remediator of FIG. 1 removes obsolete firewall rules from a firewall, according to various embodiments. As shown, rules remediator 116 is configured to collect various data from running services DB 124 and firewall rules DB 126 in order to update the firewall rules implemented by firewalls 134. In particular, rules remediator 116 accesses services data stored in running services DB 124 and rules data stored in firewall rules DB 126 and then compares these two datasets to identify firewall rules that are obsolete and should be remediated via removal. In doing so, rules remediator 116 may compare individual entries stored in running services DB 124 or firewall rules DB 126 to identify such obsolete rules.

As a general matter, a firewall rule is considered "obsolete" when that rule meets at least one of the following criteria: (i) the firewall rule is not defined with respect to an IP address associated with an active server 132, and (ii) the firewall rule does not correspond to a service that is running on an active server 132. Rules remediator 116 may identify an obsolete firewall rule meeting the first criteria by determining that the IP address specified in the rule does not match any of the IP addresses associated with any of the active servers 132. Rules remediator 116 may identify an obsolete firewall rule meeting the second criteria by determining that the server 132 associated with an IP address specified in the firewall rule is not currently listening on any of the ports specified in the firewall rule.

An example of this latter situation is depicted in FIG. 8. In this example, rules remediator 116 would access running services DB 124 to extract services entry 800. Services entry 800 indicates a set of services currently running on a server 132(N) having IP address 1.2.3.N. Rules remediator 116 would then access firewall rules DB 128 to extract rules entry 810. Rules entry 810 indicates various sets of firewall rules implemented by firewall 134(N), including rulesets RSP and RSQ. Rules remediator 116 would then compare services entry 800 with rules entry 810 and determine that RSP corresponds to the service indicated by services entry 800. However, rules remediator 116 also determines that RSQ describes a service that is not running on server 132(N).

Specifically, RSQ indicates that a server with IP address 1.2.3.N has a UDP service running on port 111 which allows incoming traffic from any source IP address. This service is not, in fact, running on server 132(N) because server 132(N) is not listening on port 111. RSQ may have been defined based on IP address 1.2.3.N when that IP address was assigned to a different server. Subsequently, that IP address may have been reallocated to server 132(N), causing server 132(N) to inherit the security policy defined by RSQ. Accordingly, RSQ is considered obsolete and rules remediator 116 transmits a removal request 820 to firewall 134(N) indicating that RSQ should be removed.

In this manner, rules remediator 116 removes obsolete rules from firewalls 134 that meet at least one of the remediation criteria discussed above. Rules remediator 116 may also implement other technically feasible remediation criteria in order to identify and remove obsolete firewall rules. Updating firewalls 134 to remove obsolete firewall rules may mitigate security weaknesses and also cause firewalls 134 to operate in a more resource efficient manner. The procedure implemented by rules remediator 116 is described as a series of steps below in conjunction with FIG. 9.

Figure 9:
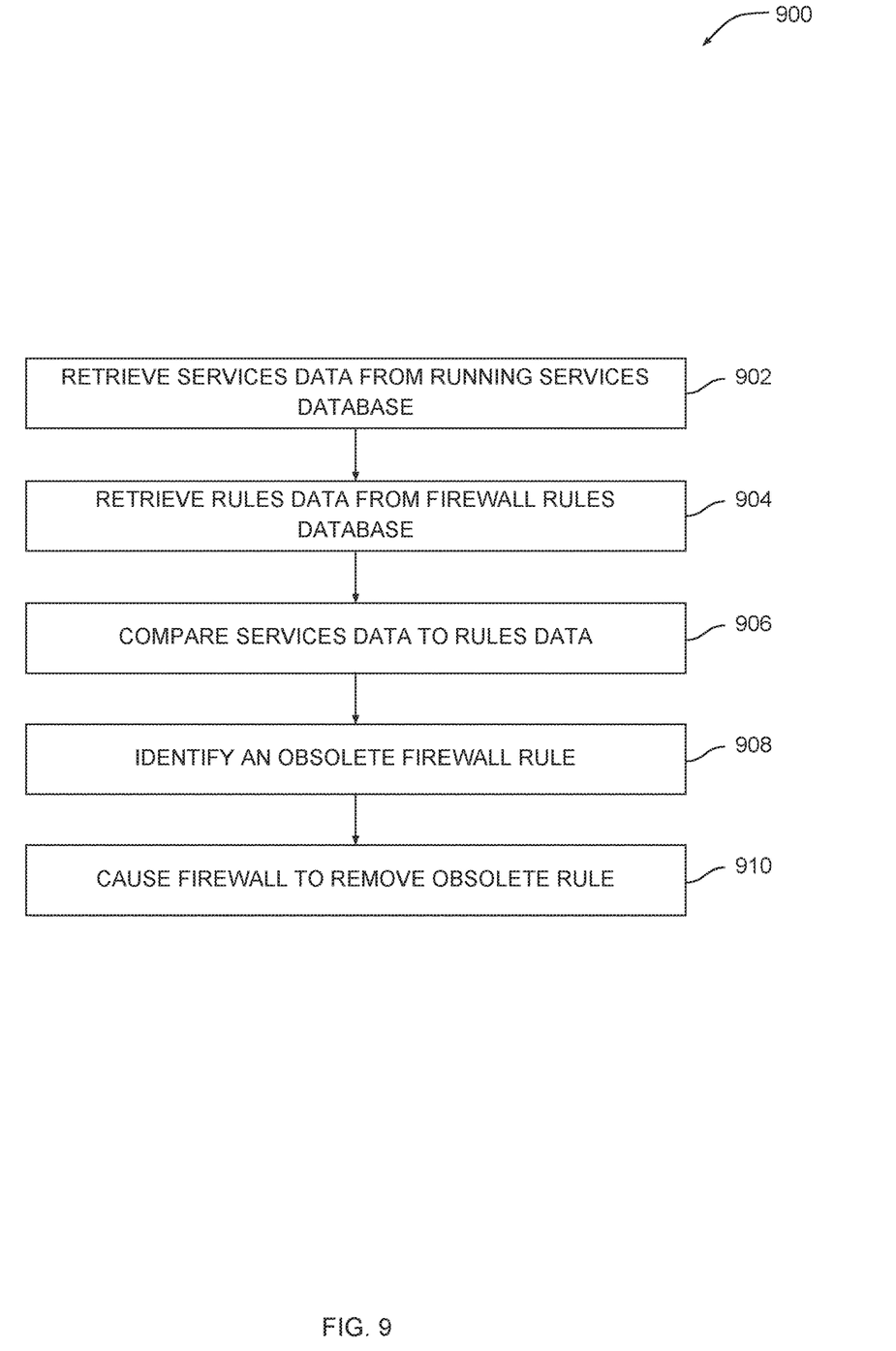
FIG. 9 is a flow diagram of method steps for remediating obsolete firewall rules from a firewall, according to various embodiments.

FIG. 9 is a flow diagram of method steps for remediating obsolete firewall rules from a firewall, according to various embodiments. Although the method steps are described in conjunction with the systems of FIGS. 1-8, persons skilled in the art will understand that any system may be configured to perform the method steps in any order.

As shown, and method 900 begins at step 902 where rules remediator 116 retrieves services data from running services DB 124. The services data indicates a set of running services currently active on servers 132. Services collector 112 may collect this data via the approach described above in conjunction with FIGS. 4-5. At step 904, rules remediator 116 retrieves rules data from firewall rules DB 128. The rules data indicates a set of firewall rules currently implemented by firewalls 134. Rules collector 114 may collect this data via the approach described above in conjunction with FIGS. 6-7.

At step 906, rules remediator 116 compares the services data to the rules data. At step 908, rules remediator 116 identifies an obsolete firewall rule. Obsolete firewall rules include to those rules which are not defined according to an IP address of an active server 132 or do not correspond to a running service on an active server 132. At step 910, rules remediator 116 causes the firewall 134 implementing the obsolete firewall rule to remove that rule.

In sum, a firewall manager periodically accesses a set of servers to identify the various services currently active on each server. The firewall manager also periodically accesses a set of firewalls configured to protect those servers to identify various firewall rules. The firewall manager then compares the services data with the rules data to identify any obsolete firewall rules that are (i) defined based on an IP address not currently allocated to any of the servers or (ii) defined based on a port of an active server that is not associated with any service running on server. Such rules are considered obsolete. Upon identifying any obsolete firewall rules, the firewall manager accesses the firewalls associated with those rules and then removes the obsolete rules.

At least one advantage of the disclosed techniques is that obsolete firewall rules cannot be inherited when servers are allocated previously used IP addresses, thereby mitigating or eliminating a significant security risk. Another advantage of these techniques is that firewall memory is continuously pruned when obsolete firewall rules are removed, thus minimizing the memory footprint associated with the storage of firewall rules. Yet another advantage is that firewall processor cycles need not be wasted examining obsolete firewall rules. Therefore, the speed with which a firewall analyzes network traffic can be maximized, thereby increasing network performance. Because the firewall manager increases network security and increases network performance, the disclosed approach represents a significant technological advancement compared to conventional approaches.

1. Some embodiments include a computer-implemented method for remediating obsolete firewall rules within a firewall, the method comprising: generating services data indicating one or more services running on a set of servers included within a network, generating rules data indicating one or more firewall rules implemented by a first firewall included in a set of firewalls, comparing at least a portion of the services data to at least a portion of the rules data to identify a first firewall rule included in the one or more firewall rules that meets at least one remediation criterion, and causing the first firewall to remove the first firewall rule from the one or more firewall rules, wherein removing the first firewall rule from the one or more firewall rules causes the first firewall to prevent at least a portion of network traffic from entering the network.

2. The computer-implemented method of clause 1, wherein generating the services data comprises: retrieving a first set of credentials from a first database, accessing a first server included in the set of servers using the first set of credentials, extracting port data from the first server that indicates a set of ports on which the first server listens for network traffic, normalizing the port data to generate normalized port data, and populating a second database with an entry that includes the normalized port data.

3. The computer-implemented method of any of clauses 1 and 2, wherein extracting the port data from the first server comprises: determining an operating system associated with the first server, determining a network inquiry command associated with the operating system based on an operating system interface corresponding to the operating system, and executing the network inquiry command on the first server to cause the first server to output the port data.

4. The computer-implemented method of any of clauses 1, 2, and 3, wherein normalizing the port data comprises parsing the port data based on an operating system interface that is associated with an operating system that is executing on the first server.

5. The computer-implemented method of any of clauses 1, 2, 3, and 4, wherein generating the rules data comprises: retrieving a first set of credentials from a first database, accessing the first firewall using the first set of credentials, extracting the one or more firewall rules from the first firewall, normalizing the one or more firewall rules to generate normalized firewall rules, and populating a second database with an entry that includes the normalized firewall rules.

6. The computer-implemented method of any of clauses 1, 2, 3, 4, and 5, wherein extracting the one or more firewall rules from the first firewall comprises: determining an operating system associated with the first firewall, determining a rules inquiry command associated with the operating system based on an operating system interface corresponding to the operating system, and executing the rules inquiry command on the first firewall to cause the firewall to output the one or more firewall rules.

7. The computer-implemented method of any of clauses 1, 2, 3, 4, 5 and 6, wherein normalizing the one or more firewall rules comprises parsing the one or more firewall rules based on an operating system interface that is associated with an operating system that is executing on the first firewall.

8. The computer-implemented method of any of clauses 1, 2, 3, 4, 5, 6 and 7, wherein the at least one remediation criterion is met by any firewall rule that specifies an address that is not associated with any server included in the set of servers.

9. The computer-implemented method of any of clauses 1, 2, 3, 4, 5, 6, 7, and 8, wherein the at least one remediation criterion is met by any firewall rule that specifies a port associated with a first server included in the set of servers on which the first server is not configured to listen for network traffic.

10. The computer-implemented method of any of clauses 1, 2, 3, 4, 5, 6, 7, 8, and 9, wherein the at least a portion of the network traffic is directed towards an address associated with a first server included in the set of servers, and wherein the address was previously allocated to another server that is no longer active.

11. Some embodiments include a non-transitory computer-readable medium storing program instructions that, when executed by a processor, cause the processor to remediate obsolete firewall rules within a firewall by performing the steps of: generating services data indicating one or more services running on a set of servers included within a network, generating rules data indicating one or more firewall rules implemented by a first firewall included in a set of firewalls, comparing at least a portion of the services data to at least a portion of the rules data to identify a first firewall rule included in the one or more firewall rules that meets at least one remediation criterion, and causing the first firewall to remove the first firewall rule from the one or more firewall rules, wherein removing the first firewall rule from the one or more firewall rules causes the first firewall to prevent at least a portion of network traffic from entering the network.

12. The non-transitory computer-readable medium of clause 11, wherein the step of generating the services data comprises: retrieving a first set of credentials from a first database, accessing a first server included in the set of servers using the first set of credentials, extracting port data from the first server that indicates a set of ports on which the first server listens for network traffic, normalizing the port data to generate normalized port data, and populating a second database with an entry that includes the normalized port data.

13. The non-transitory computer-readable medium of any of clauses 11 and 12, wherein extracting the port data from the first server comprises: determining an operating system associated with the first server, determining a network inquiry command associated with the operating system based on an operating system interface corresponding to the operating system, and executing the network inquiry command on the first server to cause the first server to output the port data.

14. The non-transitory computer-readable medium of any of clauses 11, 12, and 13, wherein normalizing the port data comprises parsing the port data into a format associated with the services data.

15. The non-transitory computer-readable medium of any of clauses 11, 12, 13, and 14, wherein the step of generating the rules data comprises: retrieving a first set of credentials from a first database, accessing the first firewall using the first set of credentials, extracting the one or more firewall rules from the first firewall, normalizing the one or more firewall rules to generate normalized firewall rules, and populating a second database with an entry that includes the normalized firewall rules.

16. The non-transitory computer-readable medium of any of clauses 11, 12, 13, 14, and 15, wherein extracting the one or more firewall rules from the first firewall comprises: determining an operating system associated with the first firewall, determining a rules inquiry command associated with the operating system based on an operating system interface corresponding to the operating system, and executing the rules inquiry command on the first firewall to cause the firewall to output the one or more firewall rules.

17. The computer-implemented method of any of clauses 11, 12, 13, 14, 15, and 16, wherein normalizing the one or more firewall rules comprises parsing the one or more firewall rules into a format associated with the rules data.

18. The non-transitory computer-readable medium of any of clauses 11, 12, 13, 14, 15, 16, and 17, wherein the first firewall rule meets the at least one remediation criterion when the first firewall rule includes an address that is not associated with any server included in the set of servers.

19. The non-transitory computer-readable medium of any of clauses 11, 12, 13, 14, 15, 16, 17, and 18, wherein the first firewall rule meets the at least one remediation criterion when the first firewall rule specifies a port associated with a first server included in the set of servers on which the first server is not configured to listen for network traffic.

20. Some embodiments include a system, comprising: a memory storing a firewall manager, and a processor that, upon executing the firewall manager, is configured to perform the steps of: generating services data indicating one or more services running on a set of servers included within a network, generating rules data indicating one or more firewall rules implemented by a first firewall included in a set of firewalls, comparing at least a portion of the services data to at least a portion of the rules data to identify a first firewall rule included in the one or more firewall rules that meets at least one remediation criterion, and causing the first firewall to remove the first firewall rule from the one or more firewall rules, wherein removing the first firewall rule from the one or more firewall rules causes the first firewall to prevent at least a portion of network traffic from entering the network.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for remediating obsolete firewall rules within a firewall, the method comprising:
    accessing one or more active servers included within a network;
    extracting services data from the one or more active servers, wherein the services data indicates a current state of one or more services currently running on the one or more active servers;
    generating rules data indicating one or more firewall rules implemented by a first firewall included in a set of firewalls;
    comparing at least a portion of the services data to at least a portion of the rules data to identify a first firewall rule included in the one or more firewall rules that meets at least one remediation criterion; and
    removing, from the first firewall, the first firewall rule from the one or more firewall rules, wherein removing the first firewall rule from the one or more firewall rules causes the first firewall to prevent at least a portion of network traffic from entering the network.

2. The computer-implemented method of claim 1, wherein accessing the one or more active servers and extracting the services data comprise:
    retrieving a first set of credentials from a first database;
    accessing a first server included in the one or more active servers using the first set of credentials;
    extracting port data from the first server that indicates a set of ports on which the first server listens for network traffic;
    normalizing the port data to generate normalized port data; and
    populating a second database with an entry that includes the normalized port data.

3. The computer-implemented method of claim 2, wherein extracting the port data from the first server comprises:
    determining an operating system associated with the first server;
    determining a network inquiry command associated with the operating system based on an operating system interface corresponding to the operating system; and
    executing the network inquiry command on the first server to cause the first server to output the port data.

4. The computer-implemented method of claim 2, wherein normalizing the port data comprises parsing the port data based on an operating system interface that is associated with an operating system that is executing on the first server.

5. The computer-implemented method of claim 1, wherein generating the rules data comprises:
    retrieving a first set of credentials from a first database;
    accessing the first firewall using the first set of credentials;
    extracting the one or more firewall rules from the first firewall;
    normalizing the one or more firewall rules to generate normalized firewall rules; and
    populating a second database with an entry that includes the normalized firewall rules.

6. The computer-implemented method of claim 5, wherein extracting the one or more firewall rules from the first firewall comprises:
   determining an operating system associated with the first firewall;
   determining a rules inquiry command associated with the operating system based on an operating system interface corresponding to the operating system; and
   executing the rules inquiry command on the first firewall to cause the firewall to output the one or more firewall rules.

7. The computer-implemented method of claim 5, wherein normalizing the one or more firewall rules comprises parsing the one or more firewall rules based on an operating system interface that is associated with an operating system that is executing on the first firewall.

8. The computer-implemented method of claim 1, wherein the at least one remediation criterion is met by any firewall rule that specifies an address that is not associated with any server included in the one or more active servers.

9. The computer-implemented method of claim 1, wherein the at least one remediation criterion is met by any firewall rule that specifies a port associated with a first server included in the one or more active servers on which the first server is not listening for network traffic.

10. The computer-implemented method of claim 1, wherein the at least a portion of the network traffic is directed towards an address associated with a first server included in the one or more active servers, and wherein the address was previously allocated to another server that is no longer active.

11. A non-transitory computer-readable medium storing program instructions that, when executed by a processor, cause the processor to remediate obsolete firewall rules within a firewall by performing the steps of:
   accessing one or more active servers included within a network;
   extracting services data from the one or more active servers, wherein the services data indicates a current state of one or more services currently running on the one or more active servers;
   generating rules data indicating one or more firewall rules implemented by a first firewall included in a set of firewalls;
   comparing at least a portion of the services data to at least a portion of the rules data to identify a first firewall rule included in the one or more firewall rules that meets at least one remediation criterion; and
   removing, from the first firewall, the first firewall rule from the one or more firewall rules, wherein removing the first firewall rule from the one or more firewall rules causes the first firewall to prevent at least a portion of network traffic from entering the network.

12. The non-transitory computer-readable medium of claim 11, wherein the steps of accessing the one or more active servers and extracting the services data comprise:
   retrieving a first set of credentials from a first database;
   accessing a first server included in the one or more active servers using the first set of credentials;
   extracting port data from the first server that indicates a set of ports on which the first server listens for network traffic;
   normalizing the port data to generate normalized port data; and
   populating a second database with an entry that includes the normalized port data.

13. The non-transitory computer-readable medium of claim 12, wherein extracting the port data from the first server comprises:
   determining an operating system associated with the first server;
   determining a network inquiry command associated with the operating system based on an operating system interface corresponding to the operating system; and
   executing the network inquiry command on the first server to cause the first server to output the port data.

14. The non-transitory computer-readable medium of claim 12, wherein normalizing the port data comprises parsing the port data into a format associated with the services data.

15. The non-transitory computer-readable medium of claim 11, wherein the step of generating the rules data comprises:
   retrieving a first set of credentials from a first database;
   accessing the first firewall using the first set of credentials;
   extracting the one or more firewall rules from the first firewall;
   normalizing the one or more firewall rules to generate normalized firewall rules; and
   populating a second database with an entry that includes the normalized firewall rules.

16. The non-transitory computer-readable medium of claim 15, wherein extracting the one or more firewall rules from the first firewall comprises:
   determining an operating system associated with the first firewall;
   determining a rules inquiry command associated with the operating system based on an operating system interface corresponding to the operating system; and
   executing the rules inquiry command on the first firewall to cause the firewall to output the one or more firewall rules.

17. The non-transitory computer-readable medium of claim 15, wherein normalizing the one or more firewall rules comprises parsing the one or more firewall rules into a format associated with the rules data.

18. The non-transitory computer-readable medium of claim 11, wherein the first firewall rule meets the at least one remediation criterion when the first firewall rule includes an address that is not associated with any server included in the one or more active servers.

19. The non-transitory computer-readable medium of claim 11, wherein the first firewall rule meets the at least one remediation criterion when the first firewall rule specifies a port associated with a first server included in the one or more active servers on which the first server is not listening for network traffic.

20. A system, comprising:
   a memory storing a firewall manager; and
   a processor that, upon executing the firewall manager, performs the steps of:
      accessing one or more active servers included within a network,
      extracting services data from the one or more active servers, wherein the services data indicates a current state of one or more services currently running on the one or more active servers,
      generating rules data indicating one or more firewall rules implemented by a first firewall included in a set of firewalls,
      comparing at least a portion of the services data to at least a portion of the rules data to identify a first firewall rule included in the one or more firewall rules that meets at least one remediation criterion, and removing, from the first firewall, the first firewall rule from the one or more firewall rules, wherein removing the first firewall rule from the one or more firewall rules causes the first firewall to prevent at least a portion of network traffic from entering the network.

* * * * *